United States Patent
Haimer

(10) Patent No.: US 9,533,393 B2
(45) Date of Patent: Jan. 3, 2017

(54) TOOL ARRANGEMENT AND TOOL RECEPTACLE FOR SUCH A TOOL ARRANGEMENT

(71) Applicant: FRANZ HAIMER MASCHINENBAU KG, Hollenbach (DE)

(72) Inventor: Franz Haimer, Hollenbach (DE)

(73) Assignee: FRANZ HAIMER MASCHINENBAU KG, Hollenbach (DE)

( * ) Notice: Subject to any disclaimer, the term of this patent is extended or adjusted under 35 U.S.C. 154(b) by 236 days.

(21) Appl. No.: 14/456,234

(22) Filed: Aug. 11, 2014

(65) Prior Publication Data

US 2015/0050097 A1    Feb. 19, 2015

(30) Foreign Application Priority Data

Aug. 14, 2013   (DE) ........................ 10 2013 108 787

(51) Int. Cl.
| | |
|---|---|
| *B23Q 11/10* | (2006.01) |
| *B23B 31/02* | (2006.01) |
| *B23B 51/06* | (2006.01) |
| *B23C 5/28* | (2006.01) |

(52) U.S. Cl.
CPC ........... *B23Q 11/1023* (2013.01); *B23B 31/02* (2013.01); *B23B 51/06* (2013.01); *B23C 5/28* (2013.01); *B23Q 11/1061* (2013.01); *B23B 2231/24* (2013.01); *Y10T 279/17111* (2015.01); *Y10T 409/304032* (2015.01)

(58) Field of Classification Search
CPC ............ Y10T 279/17111; Y10T 408/44; Y10T 408/45; Y10T 408/455; Y10T 409/303976; Y10T 409/304032; B23B 51/06; B23B 2231/24; B23Q 11/1023; B23Q 11/1038; B23Q 11/1053; B23Q 11/1061

IPC ........................................................ B23Q 11/10
See application file for complete search history.

(56) References Cited

U.S. PATENT DOCUMENTS

| | | | | |
|---|---|---|---|---|
| 5,702,211 | A  * | 12/1997 | Roemer | ................ B23B 31/006 279/20 |
| 6,305,696 | B1 * | 10/2001 | Sugata | .................. B23B 31/208 279/20 |
| 6,808,342 | B2 * | 10/2004 | Kress | ................. B23Q 11/1023 408/59 |

(Continued)

FOREIGN PATENT DOCUMENTS

| | | |
|---|---|---|
| DE | 19618540 A1 | 1/1997 |
| DE | 20106205 U1 | 7/2002 |

(Continued)

OTHER PUBLICATIONS

Machine translation of DE 10220526, printed May 2016.*
Machine translation of DE 102010020951, printed May 2016.*

*Primary Examiner* — Daniel Howell
(74) *Attorney, Agent, or Firm* — Paul D. Bianco; Fleit Gibbons Gutman Bongini & Bianco PL

(57) ABSTRACT

A tool arrangement with a tool receptacle and a tool, with at least one fluid channel for supplying a fluid to the tool provided in the tool arrangement. In order to allow an improved supply of alternative fluids to the tool, the fluid channel has at least one throttle point for maintaining the pressure in the fluid channel upstream of the throttle point, and the throttle point is suitable for keeping the pressure on the fluid sufficiently high such that no excessive premature evaporation of the fluid takes place.

21 Claims, 3 Drawing Sheets

(56) References Cited

U.S. PATENT DOCUMENTS

| | | | |
|---|---|---|---|
| 6,905,294 B2 * | 6/2005 | Sugata | B23Q 11/1046 408/58 |
| 7,125,208 B2 | 10/2006 | Schweizer et al. | |
| 2005/0029423 A1 * | 2/2005 | Vlismas | B23B 31/1075 248/314 |
| 2005/0095075 A1 | 5/2005 | Schweizer et al. | |
| 2008/0185793 A1 | 8/2008 | Haimer et al. | |

FOREIGN PATENT DOCUMENTS

| | | | | |
|---|---|---|---|---|
| DE | 10210906 A1 | | 10/2003 | |
| DE | 10220526 A1 | * | 11/2003 | B23Q 1/0018 |
| DE | 102005013483 A1 | | 9/2006 | |
| DE | 102010020951 A1 | * | 11/2011 | B23B 31/02 |
| EP | 1072356 A2 | * | 1/2001 | B23B 31/028 |
| JP | 09239637 A | * | 9/1997 | |

\* cited by examiner

TOOL ARRANGEMENT AND TOOL RECEPTACLE FOR SUCH A TOOL ARRANGEMENT

BACKGROUND OF THE DISCLOSURE

The disclosure relates to a tool arrangement and a tool receptacle for such a tool arrangement.

FIELD OF THE DISCLOSURE

Modern machine tools generally have the possibility of an internal supply of coolant. They typically contain a coolant supply, via which the coolant can be directed through the machine spindle of the machine tool and a central coolant channel in the tool receptacle to the tool.

DE 10 2005 013 483 A1 discloses a tool receptacle of the type in question, in which a fluid supply is provided in a receptacle body for supplying a cooling and/or lubricating fluid to a tool inserted into a receiving opening of the tool body. In this known tool holder, the fluid supply is formed by a passage in a tubular transfer element arranged in the receptacle body, by a passage in a stop sleeve arranged in the receptacle body, and via a connecting pipe between the transfer element and the stop sleeve. This tool receptacle is provided for supplying conventional cooling lubricants.

Alternative cooling concepts are increasingly being used in addition to conventional cooling lubricants, especially for the machining of demanding materials. In cryogenic process cooling, for example, liquid nitrogen or liquid $CO_2$ is guided under pressure through the tool receptacle to one or more cooling bores running through the tool. In the snow jet cooling method, liquid $CO_2$ is directed to the point of action, where it expands and forms a mixture of dry ice and cold gas. There should not be any premature evaporation in this cooling concept, however. Therefore, the tool receptacles must be designed specifically for these cooling concepts.

SUMMARY OF THE DISCLOSURE

An embodiment of the disclosure creates a tool receptacle for such a tool arrangement that enables an improved supplying of alternative fluids to the tool.

In the tool arrangement according to the disclosure, at least one throttle point for maintaining the pressure inside the fluid channel upstream of the throttle point is provided in the fluid channel running through the tool receptacle and the tool. In that way it can be guaranteed that the pressure of the fluid is kept high as long as possible, and thus there is no premature evaporation of the fluid. For example, the pressure of liquid $CO_2$ inside the tool receptacle or the tool can be held to 5.2 bar, or better yet, 10 or 20 bar, and the evaporation there can be kept low and ice formation can be avoided. Ideally, the pressure is kept approximately sufficiently high that it lies on the boiling line at the respective ambient temperature, e.g. 57 bar at 20° C. It is understood that a certain pressure drop is unavoidable, merely because of conduction losses and an accompanying evaporation of a portion of the liquid $CO_2$. The remaining liquid $CO_2$ should not depressurize and evaporate until the actual point of action, i.e. as close as possible to the cutting edge, and cool the cutting edge by absorbing energy of evaporation from the surroundings of the cutting edge. The liquid $CO_2$ can be supplied uncooled, i.e. at room temperature, because a temperature drop only occurs due to the evaporation and expansion of the gas.

The throttle point can be arranged in a fluid supply of the tool receptacle and/or an additional fluid supply inside the tool. Throttle points can expediently be provided at the transition from the tool receptacle to the tool and/or at the outlet of the additional fluid supply inside the tool, in the area of a cutting edge. It is particularly expedient if the distance of the throttle point from the exit point of the fluid channel into the environment corresponds approximately to the diameter of the tool. This allows a (partial) evaporation and therefore a targeted cooling action already in the interior of the tool, which results in a good and uniform cooling effect on the tool, especially in the cutting edge area. The result is that the thermal stress on the tool is reduced due to the lower temperature gradient. "Approximately" means that deviations of the distance from the throttle point to the cutting edge of 20% are included.

Depending on the tool and the desired cooling profile, however, the throttle point can also be arranged farther from the exit point.

If branches are provided in the fluid supply, the throttle point can also be provided upstream of the branch or downstream thereof, in which case multiple throttle points are necessary.

The term "throttle point" need not necessarily be understood to mean a single place. The throttling can also be gradated at a number of successive points along the fluid channel. A gradual restriction of the cross section, e.g. by a fluid channel tapering conically over a certain length, is also possible.

The throttle point inside the tool receptacle is expediently located as closely as possible to the tool shank. For example, it can be arranged in a stop part provided in the tool receptacle or in a sealing piece contacting the tool shank of the tool.

Independently of whether the sealing piece also has the function of a throttle, the sealing piece contacting the tool shank of the tool is expediently elastically yielding or arranged to oscillate about a longitudinal axis in the stop part. Even if there is unevenness at the end of the tool shank, a tight connection can be achieved as a compensation. The sealing piece can have different shapes for optimal adaptation to the respective tools.

The throttle point can have a fixed or variable throttle cross section. The fluid supply in the receptacle body can be formed by a passage hole in the stop part, an additional passage hole in a transfer element arranged in the receptacle body, and a connecting tube arranged in the receptacle body for connecting the two passage holes.

The throttle point preferably has a cross-sectional ratio that is less than 0.5, particularly preferably 0.2 and very particularly preferably 0.1. Such a cross-sectional ratio is particularly suitable for keeping the pressure on a fluid such as liquid $CO_2$ sufficiently high that no excessive premature evaporation takes place in the fluid supply. The cross-sectional ratio for one or more throttle points is to be understood as the ratio of the sum of all cross sections downstream of the throttle points to the sum of all cross sections upstream of the throttle points.

A sealing sleeve supported by seals, radially relative to the receptacle body, is preferably arranged between the transfer element and the stop part. A vibration-damped and centered arrangement of the sealing sleeve is achieved by means of the seals.

A sealing piece for sealed connection to a machine-side transfer lance can be provided in the transfer element. This sealing piece can be connected via a seal to the transfer element and/or via a snap connection to the transfer element.

An additional fluid channel separated from the above-described fluid supply and not in fluidic connection thereto can also be provided in the receptacle body. Thus, liquid $CO_2$, for example, can be conducted under pressure by the fluid supply through the tool receptacle to one or more cooling bores running through the tool, while an oil mist or other conventional cooling lubricant can be guided via the additional fluid channel to the outside of the tool shank and along it to the tool cutting edge. A separate supply of two fluids through separate fluid channels in the tool would also be possible. Thereby the field of use for the tool receptacle can be expanded. The two fluid supplies are completely separated from one another and have separate inlets and outlets on the tool receptacle. Inside the tool receptacle, there is no mixture of the fluids introduced by the two fluid supplies.

The additional fluid channel can be formed by at least one passage channel that is separated from the passage hole in the stop part, at least one additional passage channel that is separated from the additional passage hole in the transfer element, and a connecting channel arranged in the receptacle body in order to connect the passage channels.

For supplying a fluid along the exterior side of a tool shank, the additional fluid channel can open into elongated slots, which are arranged on the inner side of the receptacle opening in the front clamping region of the receptacle body. These longitudinal slots can run conically, whereby an accelerated and directed jet guidance can be achieved here as well.

The tool receptacle is preferably designed as a shrink-fit chuck with a front clamping region that can be expanded by heating. It could also be designed as a collet chuck with a collet and a clamping nut, as an expansion chuck, or as a roller chuck or the like.

BRIEF DESCRIPTION OF THE DRAWINGS

Additional details and advantages of the disclosure emerge from the following description of preferred embodiments with reference to the drawing. In the drawing.

DETAILED DESCRIPTION OF THE DISCLOSURE

Figure 1:
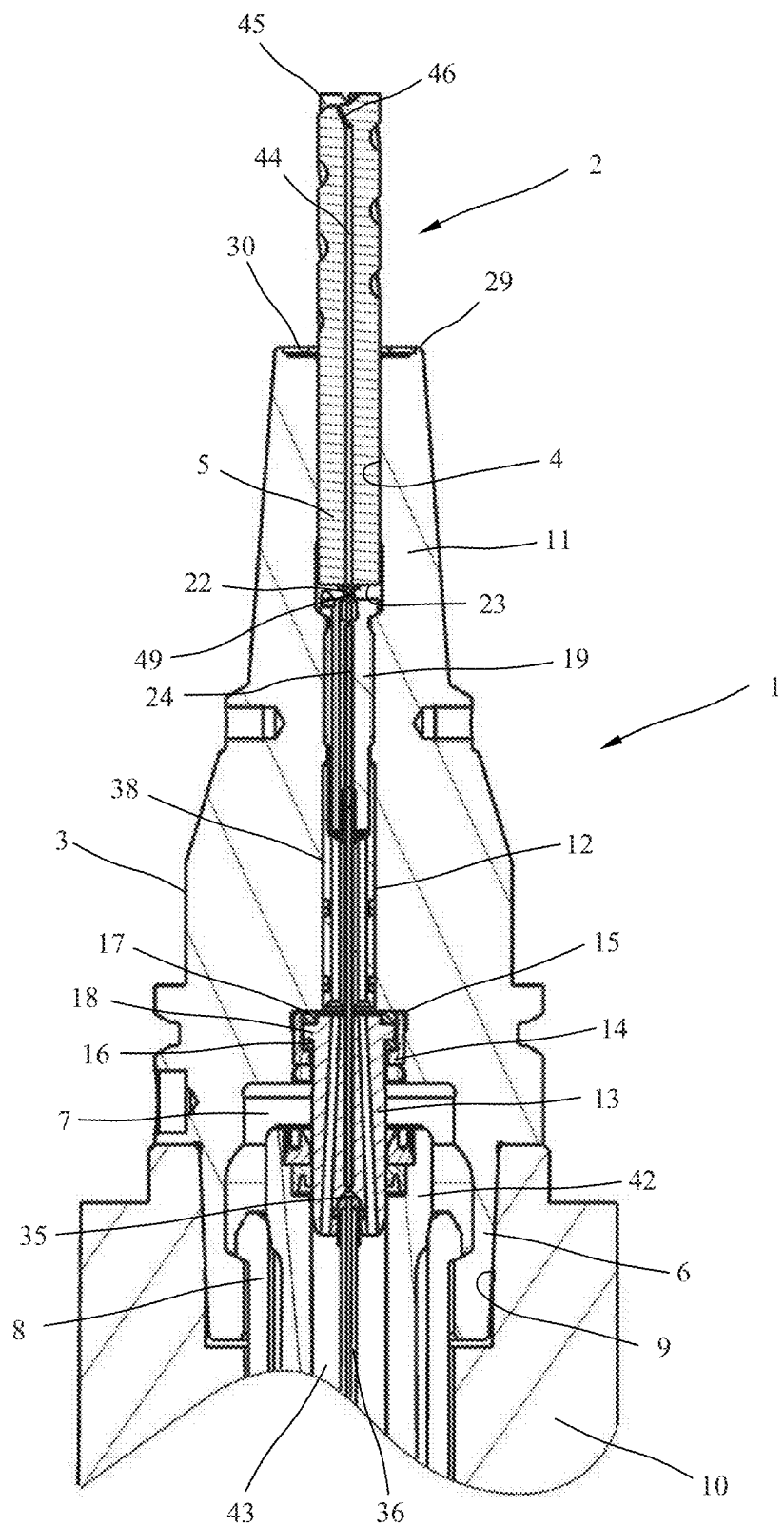
FIG. 1 shows a first embodiment of a tool arrangement with a tool receptacle and a tool in a longitudinal section.

FIG. 1 shows an embodiment of a tool arrangement with a tool receptacle 1 and a tool 2. The tool receptacle 1, embodied here as an HSK tool receptacle, contains a rotationally symmetrical receiving body 3, which is rotatable about a central axis and contains a receiving opening 4 at a tool end for a tool shank 5 of the tool 2 configured as a drill, milling cutter or the like, for example, and a clamping cone 6 at a machine end, with a cavity 7 for engagement with pincer-like clamping elements 8. The tool receptacle 1 is inserted with the clamping cone 6 into a corresponding conical receptacle 9 of a machine spindle 10, and is clamped by the pincer-like clamping elements 8 of a clamping device integrated into the machine spindle 10.

In the embodiment shown, the tool receptacle 1 is constructed as a shrink fit chuck and contains a front clamping region 11 in which the receiving opening 4 for the tool shank 5 of the tool 2 is arranged, the receiving opening being centered relative to the center axis on the receptacle body 3. In such a tool receptacle 1, the front clamping region 11 of the receptacle body 4 is heated, by inductive heating for example, whereby the internal diameter of the receiving opening 4 is enlarged. The tool shank 5 of the tool 2 is inserted into the receiving opening 4 in the heated state of the front clamping region 11, the ratio of the inside diameter of the receiving opening 4 to the outside diameter of the tool shank 5 being designed such that the tool 2 is retained tightly in the tool receptacle 1 upon subsequent cooling of the clamping region 11.

Figure 2:
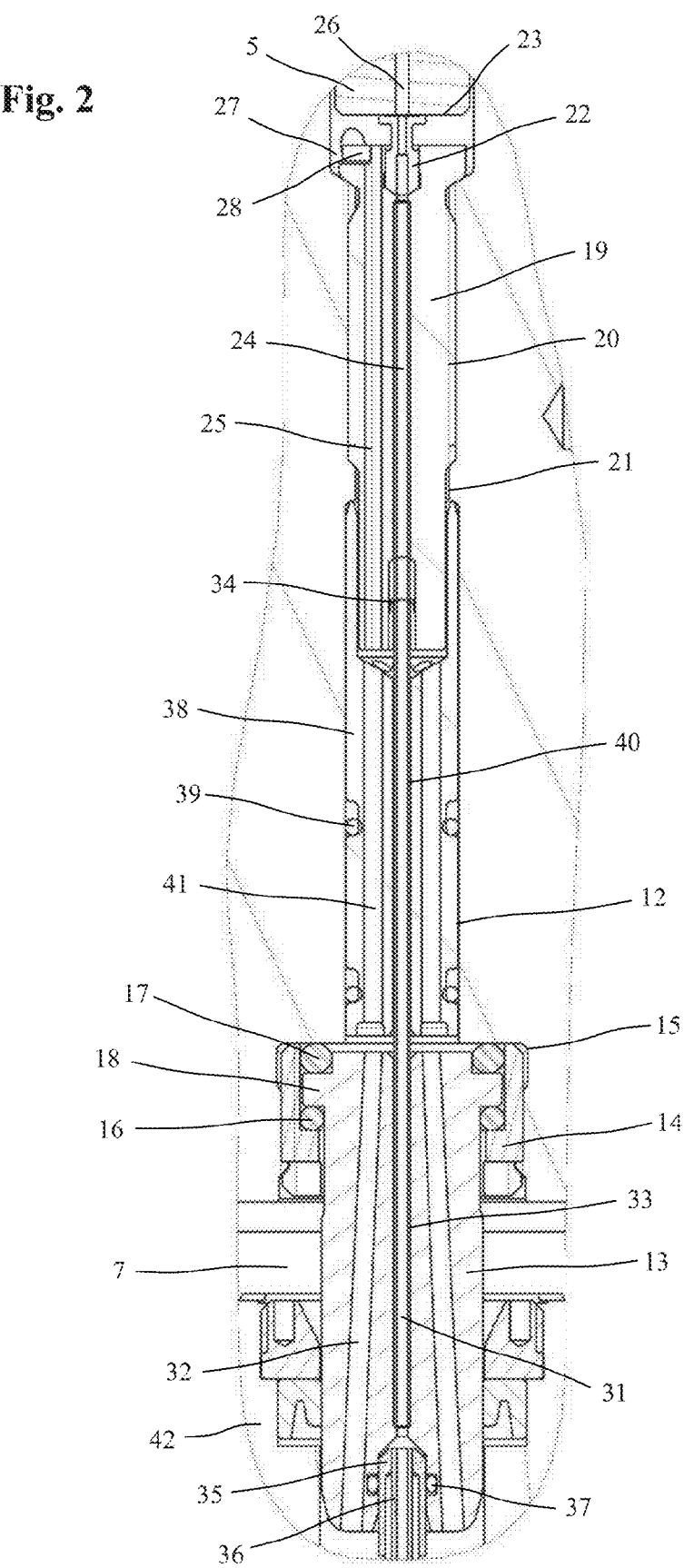
FIG. 2 shows an enlarged detail view of a region of FIG. 1.

As can be seen particularly from FIG. 2, the receptacle body 3 contains a central passage opening 12, which runs from the extended cavity 7 at the machine end of the receptacle body 3 centrally through the receptacle body 3 up to the receiving opening 4 for the tool shank 5. A tubular transfer element 13 is arranged in the receptacle body 3 at the transition from the cavity 7 to the passage opening 12. The tubular transfer element 13 is arranged via a threaded sleeve 14 in a stepped extension 15 at the transition from the cavity 7 to the passage opening 12 and is fixed radially by seals 16 and 17. For this purpose, the tubular transfer element 13 has an annular collar 18, and the threaded sleeve 14 is screwed in the manner of a cap nut with an external thread into a matching internal thread of the stepped extension 15.

A sleeve-like stop part 19 is arranged to be axially movable in the passage opening 12 at the transition from the passage opening 12 to the receiving opening 4 for the tool shank 5. For this purpose, the sleeve-like stop part 19 is screwed via an external thread 20 into a matching internal thread 21 at the end of the central passage opening 12 that opens into the receiving opening 4. At the end of the sleeve-like stop part 19 facing the tool shank 6, the sleeve-like stop part as a sealing piece 22 for contact with a rear end face 23 of the tool shank 5.

As can be recognized in FIG. 2, the sleeve-like stop part 19 has a central passage hole 24 and a plurality of passage channels 25 separated therefrom, which are offset radially outward in relation to the passage hole 24 and run longitudinally through the stop part 19 with equal angular spacing in the circumferential direction. The passage channels 25 arranged around the central passage hole 24 can have an annular segment-shaped cross section. At the end of the stop part 19 facing the tool shank 3, the sealing piece 22 provided with a passageway is arranged for a sealed connection between the central passage hole 24 and a central cooling bore 26 running through the tool shank 6.

The receiving opening 4 arranged in the front clamping region 11 of the receptacle body 3 is broadened radially at the inner end, so that a distribution space 27 for a cooling lubricant introduced via the passage channels 25 is formed between the inner end of the tool shank 6 and the receiving opening 5. Radial recesses 28 opening at the inner end of the sleeve-like stop part 19 into the passage channels 25 are provided for connecting the passage channels 25 to the distribution space 27. On the inner side of the receiving opening 4 in the front clamping region 11, it is possible to arrange a plurality of longitudinal slots at a distance from one another, via which the cooling lubricant conducted through the passage channels 25 in the stop part 19 can be directed along the exterior side of the tool shank 5 to the anterior end face 29 of the receptacle body 3. The longitudinal slots can also run conically, i.e. can have a cross section that narrows toward the front. Thereby the cooling lubricant introduced via the passage channels 25 can be oriented to the tool 2. In addition, this can effect an acceleration of the cooling lubricant jet. This results in less scattering loss outside the chuck, and lubricant and air can be separated better.

A distributor disk 30, shown in FIG. 1, with distributor bores or distributor slots for directed distribution of the fluid conducted through the longitudinal bores to the front end face 29 can be arranged in a corresponding recess at the front end face 29 of the receptacle body 3.

It can be recognized from FIG. 2 that the tubular transfer element 13 also has a central passage hole 31 and a plurality of passage channels 32 separated therefrom, which are offset radially outward in relation to the central passage hole 31 and run longitudinally through the transfer element 13 with equal angle spacing in the circumferential direction. Here too, the passage channels 32 arranged around the central passage hole 31 have an annular segment-shaped cross section. The passage hole 24 in the stop part 19 is connected to the passage hole 31 in the transfer element 19 by a connecting tube 33 that is seated with its ends in the passage hole 24 of the stop part 19 and the passage hole 31 of the transfer element 13.

In the embodiment shown, the end of the connecting tube 33 seated in the passage hole 31 of the transfer element 13 is axially secured in the transfer element 13, while the end of the connecting tube 33 protruding into the passage hole 24 of the stop part 19 is axially movable relative to the stop part 19 and is seated in the passage hole 24 and sealed by a seal 34. Thereby the stop part 19 can be moved axially for adjustment. The connecting tube 33 can of course also be axially secured in the stop part 19 and movable in the transfer element 13. At the end of the transfer element 13 facing the machine spindle 10, the passage hole 31 has a region with expanded diameter. A sealing piece 35 of a transfer lance 36 arranged in this region is radially sealed by an O-ring 37. The sealing can also be accomplished by pressing the end face of the sealing piece 35 onto a sealing element. The O-ring or the sealing element is preferably made from a plastic that still has sufficient elasticity even at low temperatures.

A sealing sleeve 38 is arranged in the passage opening 12 of the receptacle body 3 between the transfer element 13 and the stop part 19. The sealing sleeve 38 is seated inside the passage opening 12 with seal rings 39 for vibration damping. The sealing sleeve 38 can also be elastic longitudinally so that it remains in sealing contact at its ends with the transfer element 13 and the stop part 19 even in case of an axial displacement of the stop part 19. In a preferred embodiment, however, it overlaps axially with the stop part 19 so that it remains in sealing contact with the stop part 19 even in case of a displacement of the stop part 19. The sealing sleeve 38 has a central passageway 40 for the connecting tube 33 and a plurality of additional connecting channels 41 separated from the passageway 40. Cavities in which the fluid can be distributed and thus find its way into the subsequent channels are located at the transfer points from the transfer element 13 to the sealing sleeve 38 and from the sealing sleeve 38 to the stop part 19.

The fluids are transferred from the machine spindle 10 to the tubular transfer element 13 by a coupling part 42 that has a passage opening 43 and can be pushed onto the transfer element 13, and by the central transfer lance 36, which is sealed by the sealing piece 35 relative to the tubular transfer element 13. A fluid can be conducted to the shank 5 of the tool 2 through the passage opening 43 in the coupling part 42 via the passage channels 32 of the transfer element 13, the connecting channels 41 of the sealing sleeve 38, and the passage channels 25 in the stop part 19. By means of the central transfer lance 36, on the other hand, liquid $CO_2$ or another additional fluid can be conducted via the transfer element 13, the connecting tube 33, and the stop part 19 to a fluid supply 44, constructed here as a central cooling bore in the tool 2. As can be seen from FIG. 1, the fluid supply 44 constructed as a coolant bore has a throttle point 46 at an exit to a cutting edge 45.

Figure 3:
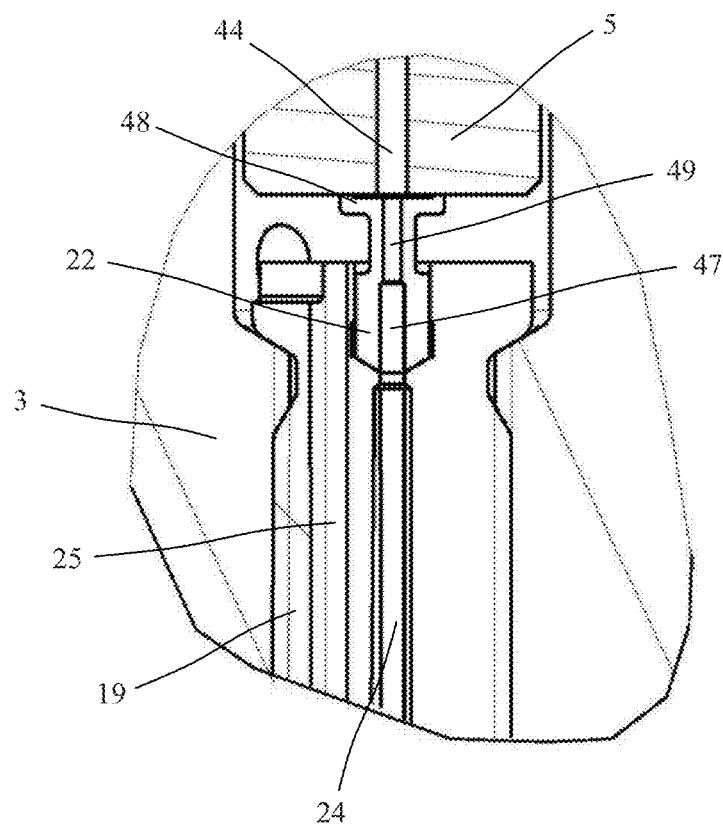
FIG. 3 shows an enlarged detail view of the seal and a second embodiment of a tool receptacle in a longitudinal section.

In an enlarged representation, FIG. 3 shows the transfer region between the stop part 19 and the tool shank 5 in the embodiment shown in FIGS. 1 and 2. At the end of the stop part 19 facing the tool shank 5, the sealing piece 22 provided with a passageway 47 is arranged for sealed connection between the central passage hole 24 and the central fluid supply 44 running through the tool shank 6. The sealing piece 22, constructed of metal, for example, is elastic in the longitudinal direction and has a plate-like contact part 48 with a metallic sealing surface. The plate-like contact part 48 is constructed such that it covers the fluid supply 44 configured as a coolant bore in the tool 2. The contact part 48 can be designed such that it can cover a number of eccentrically arranged cooling bores 26 in the tool shank 5. The sealing piece 22 can be fixed or can be arranged to oscillate about the longitudinal axis in the stop part 19. An oscillating arrangement can be achieved, for example by constructing the sealing piece 22 elastically or pivotably in the stop part 19 via a spherical cap. By means of an oscillating arrangement, the sealing piece 22 can better adapt to possible imprecision or unevenness at the end of the tool shank 5. A throttle point 49 for maintaining the pressure upstream of the throttle point 49 is provided in the passageway 47 of the sealing piece 22. Due to the throttle point, the diameter of the fluid channel is reduced, whereby the pressure can be kept high.

Figure 4:
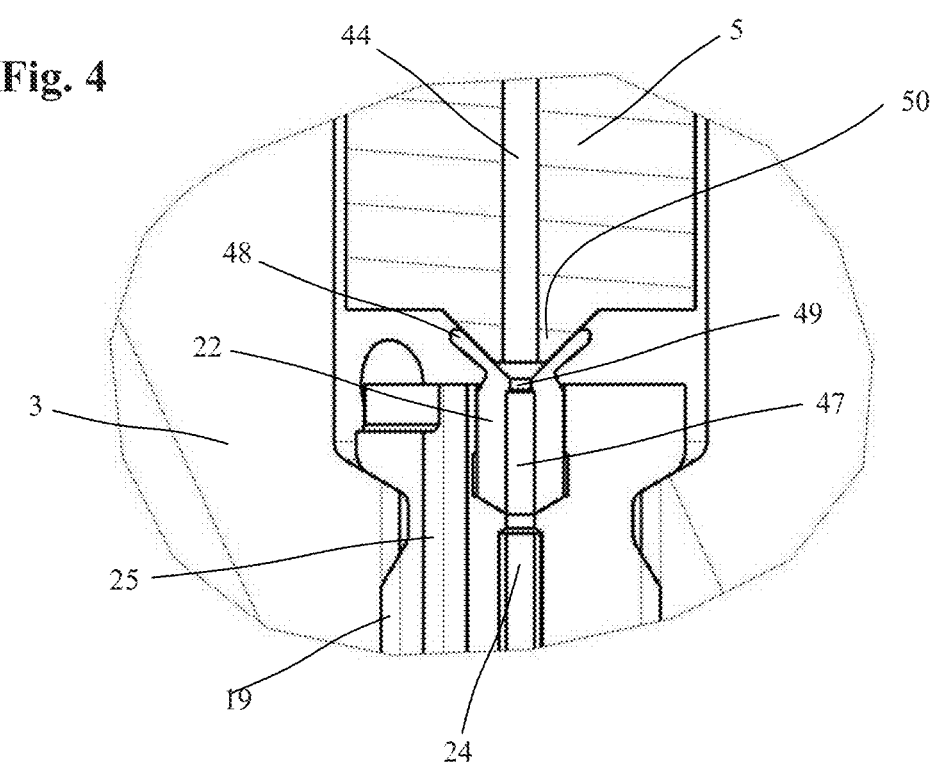
FIG. 4 shows an enlarged detail view of a seal according to another embodiment.

FIG. 4 shows an additional embodiment of a sealing piece 22, which is arranged at the end of the stop part 19 facing the tool shank 5. This sealing piece 22 is used for sealing in relation to a tool shank 5 that has a point 50 at its rear end. The sealing piece 22 here contains a conical contact part 48, which covers the point 50 at the rear and of the tool shank 5. Here too, a throttle point 49 for maintaining the pressure upstream of the throttle point 49 is provided in the passageway 47 of the sealing piece 22. The sealing piece 22 here can also be arranged on the stop part 19 fixedly or oscillating about the longitudinal axis.

What is claimed is:

1. A tool arrangement comprising a tool receptacle and a tool, wherein a fluid channel for supplying a fluid to the tool is provided in the tool arrangement, wherein the fluid channel has a throttle point for maintaining the pressure in the fluid channel upstream of the throttle point, and the throttle point is suitable for keeping the pressure on the fluid sufficiently high so that no excessive premature evaporation of the fluid takes place, and wherein the fluid channel has a first fluid supply inside the tool receptacle and a second fluid supply is located inside the tool.

2. The tool arrangement according to claim 1, wherein the throttle point is arranged in the second fluid supply.

3. The tool arrangement according to claim 2, wherein the throttle point has a distance from an outlet point of the flow channel into the environment that corresponds at least approximately to a diameter of the tool.

4. The tool arrangement according to claim 1, wherein the throttle point is arranged in the first fluid supply.

5. The tool arrangement according to claim 4, wherein the throttle point of the tool receptacle is arranged in a stop part arranged in the tool receptacle or in a sealing piece contacting a tool shank of the tool.

6. The tool arrangement according to claim 5, wherein the first fluid supply is formed by a passage hole in the stop part, an additional passage hole in a transfer element arranged in the receptacle body, and a connecting tube arranged in the receptacle body for connecting the two passage holes.

7. The tool arrangement according to claim 1, wherein the second fluid supply is constructed as a central coolant bore or as a plurality of separately guided bores.

8. The tool arrangement according to claim 1, wherein the throttle point has a cross-sectional ratio that is less than 0.5.

9. The tool arrangement according to claim 1, wherein the fluid is liquid $CO_2$.

10. A tool receptacle with a receptacle body containing a receiving opening for a tool shank of a tool and a fluid supply running through the receptacle body to supply fluid to the tool, wherein a throttle point is arranged in the fluid supply and maintains pressure on the fluid sufficiently high so that no excessive premature evaporation of the fluid occurs, and wherein the throttle point is arranged in a stop part arranged in the tool receptacle or in a sealing piece contacting a tool shank of the tool.

11. The tool receptacle according to claim 10, wherein the sealing piece is elastically yielding.

12. The tool receptacle according to claim 10, wherein the throttle point has a fixed or variable throttle cross section.

13. The tool receptacle according to claim 10, wherein the fluid supply is formed by a passage hole in the stop part, an additional passage hole in a transfer element arranged in the receptacle body, and a connecting tube arranged in the receptacle body for connecting the two passage holes.

14. The tool receptacle according to claim 13, wherein a sealing sleeve supported radially against the receptacle body by seals is arranged between the transfer element and the stop part.

15. The tool receptacle according to claim 10, wherein an additional fluid channel that is not connected to the fluid supply and provides a secondary fluid supply separate from the fluid supply runs through the receptacle body to the tool.

16. The tool receptacle according to claim 15, wherein the additional fluid channel is formed by at least one passage channel separate from the passage hole in the stop part, at least one additional passage channel separate from the additional passage hole in the transfer element, and at least one connecting channel arranged in the receptacle body for connecting the passage channels.

17. The tool receptacle according to claim 10, wherein the throttle point has a cross-sectional ratio that is less than 0.5.

18. The tool receptacle according to claim 10, wherein the fluid is liquid $CO_2$.

19. A tool coupleable to a tool receptacle having a tool receptacle fluid supply, the tool comprising a cutter and a tool fluid supply for supplying a fluid to the cutter, wherein a throttle point for maintaining the pressure inside the tool fluid supply upstream of the throttle point is provided in the tool fluid supply and is suited to keep the pressure on the fluid sufficiently high so that no excessive premature evaporation of the fluid takes place.

20. The tool according to claim 19, wherein the distance of the throttle point from the exit point of the tool fluid supply into the environment corresponds at least approximately to a diameter of the tool.

21. The tool according to claim 19, wherein the throttle point has a cross-sectional ratio that is less than 0.5.

* * * * *